US010231055B2

(12) United States Patent
Nyegaard et al.

(10) Patent No.: US 10,231,055 B2
(45) Date of Patent: Mar. 12, 2019

(54) GAMING HEADSET WITH ADJUSTABLE CONTACT PRESSURE

(71) Applicant: Sennheiser Communications A/S, Ballerup (DK)

(72) Inventors: Lars Elliot Nyegaard, Ballerup (DK); Andreas Jessen, Ballerup (DK); Klaus Sommer Ipsen, Ballerup (DK); Peter Vestergaard Værum, Ballerup (DK)

(73) Assignee: Sennheiser Communications A/S, Ballerup (DK)

( * ) Notice: Subject to any disclaimer, the term of this patent is extended or adjusted under 35 U.S.C. 154(b) by 0 days.

(21) Appl. No.: 15/608,296

(22) Filed: May 30, 2017

(65) Prior Publication Data

US 2017/0347194 A1    Nov. 30, 2017

(30) Foreign Application Priority Data

May 31, 2016    (EP) .................................... 16172213

(51) Int. Cl.
| | |
|---|---|
| *H04R 25/00* | (2006.01) |
| *H04R 5/033* | (2006.01) |
| *H04R 1/10* | (2006.01) |
| *H04M 1/05* | (2006.01) |
| *H04R 19/04* | (2006.01) |

(52) U.S. Cl.
CPC ......... *H04R 5/0335* (2013.01); *H04R 1/1008* (2013.01); *H04R 1/1058* (2013.01); *H04R 1/1066* (2013.01); *H04M 1/05* (2013.01); *H04R 5/033* (2013.01); *H04R 19/04* (2013.01); *H04R 2201/109* (2013.01)

(58) Field of Classification Search
CPC .... H04R 1/1008; H04R 1/105; H04R 1/1058; H04R 1/1066; H04R 1/1091; H04R 5/033; H04R 5/0335; H04R 2201/10; H04R 2201/109; H04M 1/05
USPC .......... 381/309, 71.6, 72, 74, 370, 374, 376, 381/377, 378, 379, 383; 379/430; 2/209; 455/569.1; 181/129
See application file for complete search history.

(56) References Cited

U.S. PATENT DOCUMENTS

| | | | |
|---|---|---|---|
| 3,447,160 A * | 6/1969 | Teder ...................... | A61F 11/14 2/209 |
| 6,333,982 B1 | 12/2001 | Sapiejewski et al. | |
| 8,170,261 B2 | 5/2012 | Danielson et al. | |
| 8,204,267 B2 * | 6/2012 | Leske ..................... | H04M 1/05 381/374 |

(Continued)

FOREIGN PATENT DOCUMENTS

| | | |
|---|---|---|
| WO | WO 89/10107 A1 | 11/1989 |
| WO | WO 2010/135314 A1 | 11/2010 |
| WO | 103067809 B | 12/2015 |

*Primary Examiner* — Huyen D Le
(74) *Attorney, Agent, or Firm* — Birch, Stewart, Kolasch & Birch, LLP (57) ABSTRACT

The invention relates to a headset comprising at least one headband and at least one earpiece, the headband comprising a headband structure, wherein the headband structure is divided in at least one soft, flexible section and at least one stiff, non-flexible section, at least one sliding spring element, at least one handle element attached to the at least one sliding spring element and at least one guiding element, guiding the relative movement between the headband structure and the at least one sliding spring element.

17 Claims, 5 Drawing Sheets

(56) References Cited

U.S. PATENT DOCUMENTS

| | | |
|---|---|---|
| 8,249,267 B2 | 8/2012 | Leske et al. |
| 2008/0037816 A1 | 2/2008 | Lee et al. |
| 2010/0046782 A1* | 2/2010 | Ito .................. H04R 5/0335 |
| | | 381/378 |
| 2013/0343592 A1 | 12/2013 | Schmidt et al. |
| 2014/0263493 A1 | 9/2014 | Amurgis et al. |

* cited by examiner

GAMING HEADSET WITH ADJUSTABLE CONTACT PRESSURE

TECHNICAL FIELD

The disclosure relates to a headset with adjustable contact pressure is based on the finding that, despite the generally superior comfort properties of a headset with adjustable headband stiffness, its aesthetics and functionality further play important roles to the user

BACKGROUND

The invention relates to a headset comprising at least one headband and at least one earpiece, the headband comprising a headband structure, wherein the headband structure is divided in at least one soft, flexible section and at least one stiff, non-flexible section, at least one sliding spring element, at least one handle element attached to the at least one sliding spring element and at least one guiding element, guiding the relative movement between the headband structure and the at least one sliding spring element.

Headsets with means for adjusting headband stiffness are generally well known. Through suitable spring mechanisms such headsets generally feature the functionality to selectively adjust the contact pressure exerted by the earpieces to the head of the user. Through adjusting the contact pressure to a suitable and individual degree, a user can ensure an optimum level of comfort and acoustic properties, particularly when wearing the headset for a longer period of time, e. g. several hours.

U.S. Pat. No. 6,333,982 B1 discloses a headset that includes a headband coupled to at least one earphone by a high torque resistance pivot which can be manually set. In another aspect of the invention, a headset includes a headband constructed and arranged for transferring a portion of the force applied by the headband to a temporal region of the user, and for modifying the portion of the force applied to the temporal region of the user.

WO 2010/135314 A1 describes a headset that includes an element to be held to the head of a wearer and a headband coupled to the element and configured for engaging a head of a wearer to hold the element thereon. The headband includes a plurality of headband arms coupled to pivot with respect to each other. A torsion spring is positioned between the arms and portions of the torsion spring are coupled to the arms for acting on the arms with a torsion force. An adjustment member is coupled between the torsion spring and a headband arm and is operable for adjusting the torsion force of the torsion spring to adjust the torsion force on the arms.

A personal audio device including a flexible headband is disclosed in U.S. Pat. No. 8,170,261 B2. A connector portion connects a second end of the left headband portion with a second end of the right headband portion. The connector portion is linearly adjustable, which enables a distance between the left headband portion and right headband portion to be variable. A change in the distance causes an inversely proportional change in bent compression force applied by a left earphone and applied by the right earphone.

CN 103 067 809 B discloses an earphone headset and an adjustment device to adjust the headband holding force. The adjustment device comprises a bridge and a pair of fasteners each connectable on the left and right side to a headphone headband. By slidingly moving the fasteners up and down along the bridge, the holding force of the earphones can be varied.

U.S. Pat. No. 8,204,267 B2 discloses an earphone having a hoop band for receiving at least one electroacoustic reproduction transducer. The hoop band has at least two hoop band portions which respectively include an angle, wherein at least two of the hoop band portions are rotatably connected together. The hoop band also has at least one adjusting unit for adjusting and fixing the angle, wherein the adjusting unit is coupled to the first and second hoop band portions. Therefore the object of the described invention is to provide headphones and a headset which permits improved adjustability of the hoop band contact pressure force.

US 2013/0343592 A1 discloses a headset having a headband, at least one fork for receiving an earpiece and a receiving portion between an end of the headband and one of the forks. The fork is arranged pivotably about a pivot axis. The fork has a first end having a support element. The receiving portion has a slider having at least two receiving positions. The support element engages into one of the at least two receiving positions of the slider and thus limits the maximum deflection of the fork about the pivot axis. The headset features the possibility to adjust a headband contact pressure force.

The disadvantage of the mentioned approaches and of adjustable stiffness headbands in general is that they require relatively large and bulky spring mechanisms that obstruct the aesthetics of the headset and significantly lower the comfort for the user.

Also, through the necessity of a relative motion between moving parts for adjusting the spring mechanism, such headsets are prone to injuries and malfunctions caused by e. g. hair, fingers or other objects interfering with the motion of the mechanism during adjusting.

Furthermore, an additional challenge exists in the even distribution of contact pressure across the earpiece. Twisting of the head set caused by forces exerted by the spring mechanism leads to discomfort and inferior acoustic properties.

It is therefore desirable to address at least one of the above problems. Headsets with adjustable headband stiffness should be improved with respect to comfort, aesthetics and product safety. At the very last, an alternative design to previous solutions should be put forward.

SUMMARY

In accordance with the invention, a headset is proposed according to claim 1.

The invention is based on the finding that, despite the generally superior comfort properties of a headset with adjustable headband stiffness, its aesthetics and functionality further play important roles to the user. Particularly, it was recognized that a spring mechanism should be integrated into the headband as opposed to being visibly built up on the headband. By applying blade springs, such advantageous spring mechanism can be achieved. By sliding a blade spring element relative to the headband structure, it can be gradually moved from a flexible to a non-flexible section, enabling the user to selectively adjust the contact pressure of the earpiece and the headset, respectively.

In general, contact pressure is created by increasing the distance between two earpieces of a headset, i. e. by pulling them apart, and thus bending the headband structure against its original shape. The stiffness of the headband structure determines the degree, to which a certain deflection of the headband structure will result in a corresponding force, i. e. contact pressure. This relation between deflection and force corresponds to the rate of a spring. By moving sliding spring elements into the flexible section of a headband structure, the stiffness of this section increases, thus resulting in an increase of the overall stiffness of the headband. This again will, due to the above mentioned relation, result in an increase of the contact pressure. Hence, the contact pressure can be gradually adjusted by moving the sliding spring elements.

It is preferably suggested that the headband structure is comprised of one soft, flexible section located in the center of the headband and two stiff, non-flexible sections, each located on the left side and on the right side of the headband. The advantage of such embodiment lies in the adjustability of the contact pressure by varying the flexibility of in particular the flexible section of the headband structure.

The headband structure may have a longitudinal length and a transverse length, where the longitudinal length is longer than the transverse length. Along the longitudinal length, the headband structure is divided into at least a left side section, a right side section and a centre section. The headband structure may be comprised of one soft, flexible section located in the centre section of the headband structure and two stiff, non-flexible sections, each located on the left side section and on the right side section of the headband structure. The advantage of such embodiment lies in the adjustability of the contact pressure by varying the flexibility of in particular the flexible section of the headband structure.

Preferably, a headband that comprises one or more sliding spring elements on each of both sides is proposed. This leads to the advantage, that through the addition of connected spring elements the spring rate and thus, the stiffness and resulting contact pressure, can be varied. That is, because of the general additive relation of spring rate of springs in parallel.

In accordance with a further embodiment, it is proposed that in case of two or a greater, even number of sliding spring elements, opposing sliding spring elements are arranged symmetrically with respect to a plane separating the right half and the left half of the headset. This is mainly advantageous because, as opposed to prior art, it was recognized that a symmetric arrangement of sliding spring elements is necessary in order prevent twisting of the headset in a horizontal plane, resulting in an uneven force distribution across the earpieces. Particularly, the side-by-side arrangement of two sliding spring elements in or on top of a headband in order to prevent obstruction of the sliding path will lead to the circumstance that the contact pressure vector will be located further towards the front of the user's head for the one earpiece and further towards the back of the user's head for the other earpiece. Hence, a symmetric arrangement of sliding springs that prevents interference between left-sided and right-sided sliding spring elements will not lead to such twisting.

The plane separating the right half and the left half of the headset may be a single rigid or a double rigid which makes the headband more stiff. Symmetrical to the plane one or more sliding spring elements may be arranged in order to provide a more symmetrical pressure to the head of the user while sliding the one or more spring elements on both sides of the plane towards an earpad of the headset.

A further preferred embodiment suggests that the at least one sliding spring element is a metal blade spring element. In particular, spring steel can be applied. But also other materials featuring the desired spring-like properties such as other metals or certain plastics can be applied.

It is preferably suggested that the contact pressure can be adjusted in a range between 350 grams and 500 grams or between 550 grams and 700 grams. These values correspond to contact pressure ranges that are likely to be expected among the commonly known user group. Of course, also smaller or larger intervals of contact pressure values can be implemented by applying sliding spring elements with corresponding material properties. Also, the number of sliding spring elements can be varied in order to realize a desired range of adjustable contact pressure values.

In accordance with a further embodiment, it is proposed that the position of the at least one sliding spring element, respectively the at least one handle element, relative to the headband structure is indicated visually by a visual indication means. The advantage of such embodiment is that it is easier to recall the optimum setting regarding the adjusted contact pressure, particularly when the headset is shared among several users.

A further preferred embodiment suggests that the position of the at least one sliding spring element, respectively the at least one handle element, relative to the headband structure is indicated via a tactile feedback. Such function leads to the advantage, that the user can selectively adjust the contact pressure, even when not looking at the visual indication means or the headset itself, for example when wearing the headset while using it, e. g. during a computer game.

A tactile feedback applied on either the handle element attached to the at least one sliding spring element, headband or earpad, may for example be of Haptic or kinesthetic communication which recreates the sense of touch by applying forces, vibrations, or motions to the user.

In accordance with a further embodiment, it is proposed that the tactile feedback is realized through dents in the at least one sliding spring element and/or an added part and/or a ratchet moulded in plastic. Such mechanism constitutes a relatively simple solution to realize the tactile feedback. Furthermore an additional aural feedback can be achieved by the snapping sound of the sliding spring element or the respective added part into the dent.

It is preferably suggested that the at least one guiding element is made out of a material featuring high stiffness and/or low friction and/or high dimensional stability. These material characteristics ensure the durability of the at least one guiding element and facilitate the adjustment of the contact pressure by reducing the friction in the relative movement of the sliding spring elements. Polyoxymethylene (POM) is a particularly suitable material that features these characteristics as well as a low weight.

In accordance with a further embodiment, it is proposed that the indication means features a discrete scale or a continuous scale for the indication of the position of the at least one sliding spring element. Such scale serves as an orientation for reproducing previous settings that the user adjusted.

A further preferred embodiment suggests that the at least one sliding spring element is fully concealed by the headband structure or at most visible through the gaps enabling the relative movement between sliding spring element and headband structure. This aspect of the invention leads to the significant advantage, that hair or fingers or other objects that are likely to obstruct the sliding path of the sliding spring elements are shielded from moving components of the spring mechanism. Hence, the safety and comfort of the product is significantly increased. In particular, the contact pressure can be safely adjusted, even when wearing the headset.

In accordance with a further embodiment, it is proposed that a rigid, top section of the headband structure does only comprise a single stiffer element, being an additional element, for increasing the sliding length of the at least one sliding spring element. Thereby, the degree to which the stiffness can be varied is higher. Thus, a wider range of contact pressure values can be realized. The additional element can be mounted on to the sliding spring element.

It is preferably suggested that a non-visible screw on top of the headband structure serves to further vary the contact pressure of the headset through exerting a variable twisting force on the sliding spring elements. Through such screw, an additional spring mechanism for increasing the range of adjustable contact pressure values can be realized without affecting the aesthetical quality of the headset.

In accordance with a further embodiment, it is proposed that the at least one sliding spring element may be driven by a motor or by magnetic levitation or other suitable actuator controllable via control elements on the headband structure or via the device the headset is connected to or via an external mobile device communicating with the headband wirelessly through a suitable radiofrequency standard such as bluetooth or DECT. Such functionality would furthermore significantly increase the comfort of the headset as it would make manual interaction with the headset for adjusting the contact pressure superfluous. Also would such functionality enable the user to choose between pre-defined settings, e. g. according to head geometry, personal preferences or previously used settings.

A headset comprising at least one headband and at least one earpiece, the headband comprising a headband structure, wherein the headband structure is divided in at least one soft, flexible section and at least one stiff, non-flexible section, at least one sliding spring element, at least one handle element attached to the at least one sliding spring element, at least one guiding element configured to guide a relative movement between the headband structure and the at least one sliding spring element. The relative movement is defined as being a movement of the sliding element relative to the headband structure or the guiding element of the headband structure. The guiding element may be part of the headband structure, and where the sliding spring element is mounted enclosed or received by the guiding element, thereby, the sliding spring element can be moved within the guiding element into different positions. The at least one sliding spring element is configured to be guided by the headband structure as well as the at least one guiding element and can be moved into the at least one flexible section and out of the at least one flexible section to thus selectively increase and decrease the stiffness of the at least one flexible section so that a contact pressure of the headset can be adjusted. The contact pressure of the headset set is defined as the amount of force the headset is pressuring against the head of the user wearing the headset. The contact pressure may be between an ear pad of the headset and the ear of the user of the headset.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
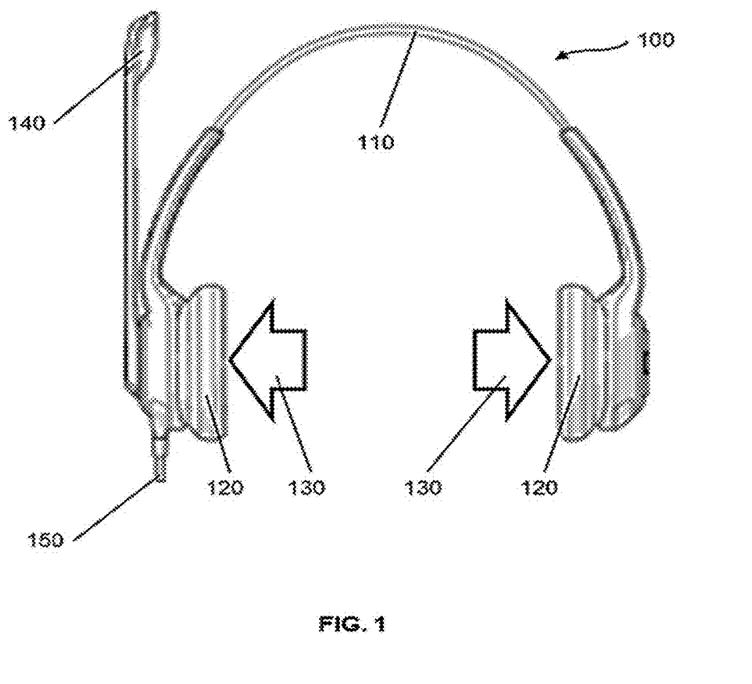
FIG. 1 shows a general illustration of a headset.

FIG. 1 illustrates a possible layout of a general headset 100. The headset 100 comprises two earpieces 120 that are connected by a headband structure 110. Through earpieces 120, an acoustic signal, e. g. music, speech, sound or the like, is delivered to the ears of the user. Depending on the stiffness of the headband structure 110, a contact pressure 130 is exerted on the user's ear. Also, it would be possible that headset 100 would only comprise one earpiece 120. The contact pressure 130 is effective between the earpieces 120, or between the left and right end points of the headband structure 110, respectively.

The shown headset 100 represents the state of the art and does not feature a functionality of adjusting the stiffness of the headband structure 110, and thus, the contact pressure 130, according to the invention. The headset 100 furthermore comprises a microphone 140, however for the scope of the invention it is not necessary for the headset 100 to feature such microphone.

The headset 100 can furthermore feature means of adjusting the length of the headband structure 110 to different head sizes by moving the earpiece 120 or an earpiece supporting structure relative to the headband structure 110. However, also this feature is not necessary for the scope of the invention.

The headset 100 can furthermore comprise a headset cable 150 for transferring signals from the headset 100 and to the headset 100. Also, the energy supply of the headset 100 can be realized via the headset cable 150. Alternatively, signals can be transferred wirelessly via a suitable radiofrequency standard. In such case, the energy supply can be realized by a suitable energy storage such as a rechargeable battery and the headset 100 would not require a headset cable 150.

Figure 2:
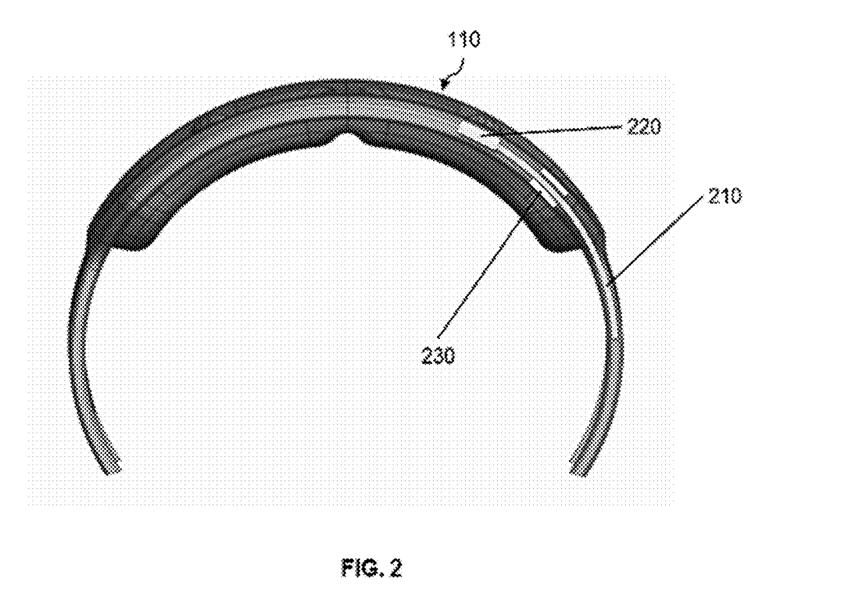
FIG. 2 shows a headband structure according to the invention.

FIG. 2 exemplary illustrates a headband structure 110 according to the invention. The headband structure 110 comprises at least one sliding spring element 210, at least one handle element 220 and at least one guiding element 230. The at least one sliding spring element 210 is preferably a metal blade. The handle element 220 can for example be a sliding knob or the like.

The at least one sliding spring element 210 may be slid downward or upward via a handle element 220 in order to selectively decrease and increase the stiffness of the at least one flexible section 320 (not shown on FIG. 2) so that the contact pressure 130 of the headset 100 can be adjusted.

The at least one sliding spring element 210 and the at least one guiding element 230 are located within the headband structure and are preferably fully concealed by the headband structure. That way the relative movement of the spring mechanism is not obstructed by any objects, for example hair or fingers, when adjusting the contact pressure by sliding the spring elements.

Also, through such shielded casing, lubricants or other additives can be applied without being apparent to the user in order to decrease the friction and thus, facilitate the movement. The application of such additive would also prevent noises such as squeaking caused by the relative movement, in particular between sliding spring element 210 and guiding element 230.

Such shielded casing furthermore has a positive impact on the robustness and longevity of the headset 100, as also smaller particles that would lead to abrasive wear and eventually mechanical failure of sliding spring elements 210, guiding elements 230 or any other related component, are prevented from entering the sliding path, i. e. the zone of relative movement.

Figure 3A:
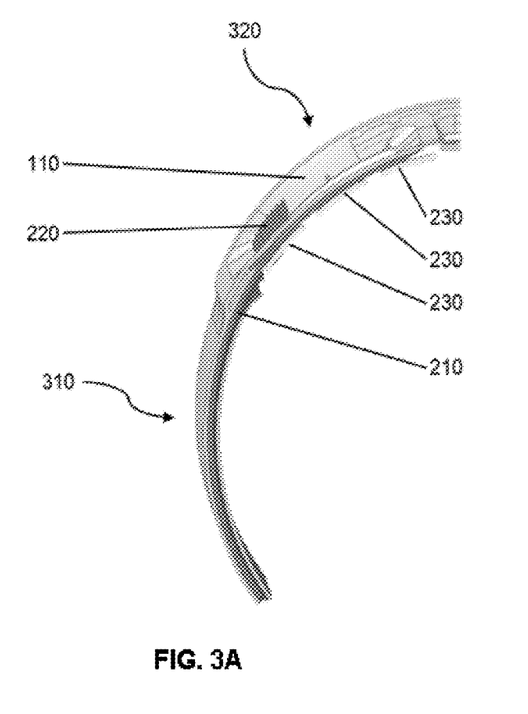
FIG. 3A shows a detailed view of one side of the headband structure with the sliding spring element in lower position.

FIG. 3A shows a detailed view of a part of the headband structure 110 with the sliding spring element 210 in a lower position. In such position, the sliding spring element 210 is to the most part contained in a lower, non-flexible section 310 of the headband structure 110. At the same time an upper, flexible section 320 of the headband structure 110 is soft compared to the non-flexible section 310, resulting in a relatively low contact pressure 130. For adjusting the contact pressure 130, a user can move up the sliding spring element 210 by sliding the handle element 220 in an upward direction. The sliding spring element 210 is guided by the at least one guiding element 230 during the relative movement.

Figure 3B:
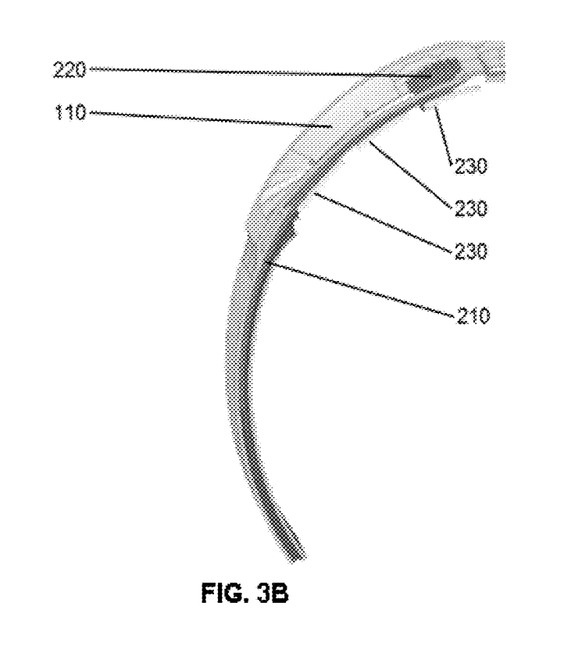
FIG. 3B shows a detailed view of one side of the headband structure with the sliding spring element in upper position.

FIG. 3B shows another detailed view of a part of the headband structure 110 with the sliding spring element 210 in an upper position. In such position, a large portion of the sliding spring element 210 is contained in the upper, flexible section 320 of the headband structure 110. As a result, the upper, flexible section 320 is stiffened out by the contained sliding spring element 210. Hence, the contact pressure exerted by the earpieces 120 has reached a maximum level. By varying the position of the sliding knob in between these two positions, the user can gradually adapt the contact pressure of the headset.

Figure 4:
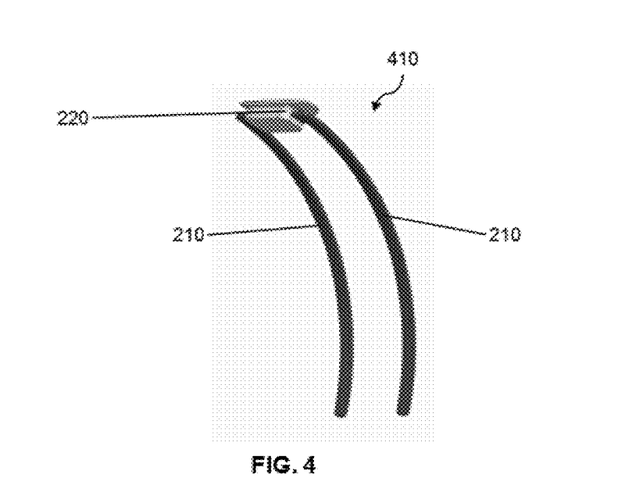
FIG. 4 shows a detailed view of the sliding spring element.

FIG. 4 illustrates by example a spring module 410, comprising two sliding spring elements 210 connected to a handle element 220. The sliding spring elements 210 are symmetrically arranged with respect to a plane dividing the headband structure 110, and the spring module 410 respectively, into a front section and a rear section. Furthermore the sliding spring elements 210 are adapted for being movable within the headband structure 110.

Figure 5:
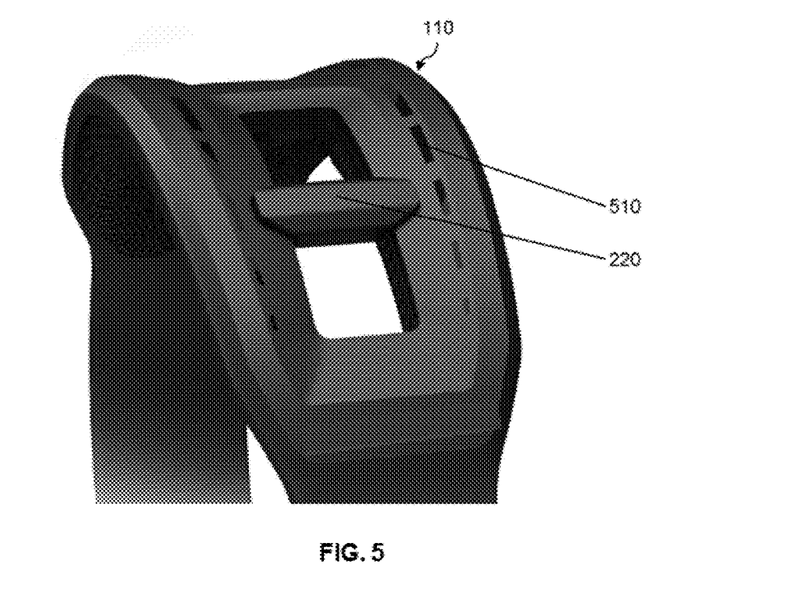
FIG. 5 shows a detailed view of a visual indication means.

FIG. 5 illustrates another preferred embodiment of the invention. In particular, a visual indication means 510 is shown that is located on the top surface of the headband structure 110 and extends along the complete sliding path of the handle element 230 and the sliding spring element 220, respectively.

Via such visual indication means, the user can easily compare the current position of the handle element 220 to discrete intervals of the visual indication means 510 and therefore is able to intuitively reproduce previous or recommended contact pressure settings. Also tactile or aural feedback means would lead to similar benefits.

Figure 6:
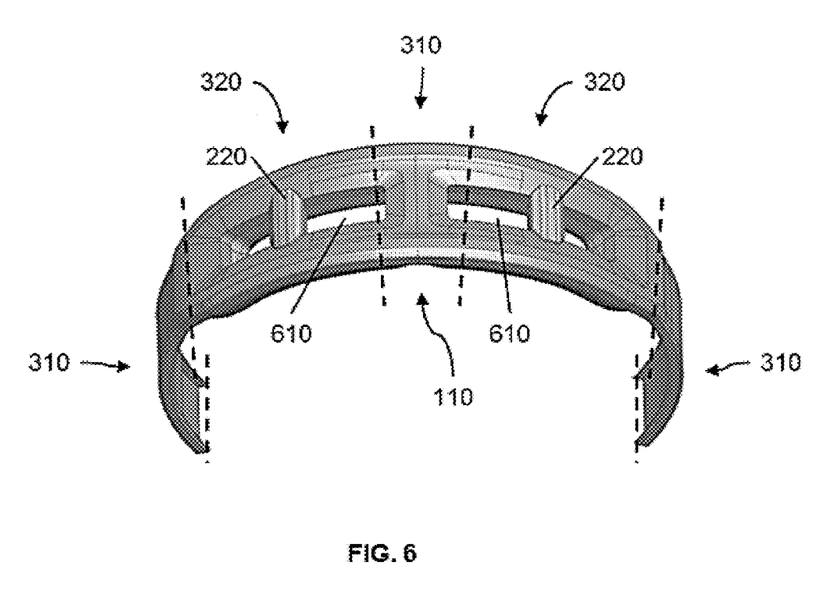
FIG. 6 shows an illustration of another preferred embodiment of the headband structure according to the invention.

FIG. 6 illustrates a detailed view of the headband structure 110 of another preferred embodiment of the invention. In this particular embodiment, the headband structure 110 is divided into three non-flexible sections 310, which feature a relatively high degree of stiffness, as well as two flexible sections 320, which feature a relatively low degree of stiffness.

Flexibility of the flexible sections 320 can be achieved by different measures. In this particular embodiment, the flexibility was achieved by reducing the cross-section of the flexible sections 320 through orifices 610 which at the same time accommodate the handle elements 220 and their respective sliding path.

Alternatively, flexibility can also be achieved by varying the thickness of the headband structure 110 or by applying materials with certain mechanical properties, in particular with a lower stiffness, in the respective sections or by conducting other according constructive measures.

The flexibility of the flexible sections 320 can be gradually lowered by the user through sliding the handle element 220 from the outer part to the inner part of the headband structure 110 and thereby moving the at least one sliding spring element 210 out of the non-flexible section 310 into the flexible section 320 of the headband structure 110.

LIST OF REFERENCE NUMERALS

100 Headset
110 Headband structure
120 Earpiece
130 Contact pressure
140 Microphone
150 Headset cable
210 Sliding spring element
220 Handle element
230 Guiding element
310 Non-flexible section, Stiff section, Rigid section
320 Flexible section, Soft section, Non-rigid section
410 Spring module
610 Orifice

The invention claimed is:

1. A headset comprising at least one headband and at least one earpiece, the headband comprising:
   a headband structure, wherein the headband structure is divided in at least one soft, flexible section and at least one stiff, non-flexible section,
   at least one sliding spring element,
   at least one handle element attached to the at least one sliding spring element,
   at least one guiding element configured to guide a relative movement between the headband structure and the at least one sliding spring element, wherein
   the at least one sliding spring element and the at least one guiding element are located within and fully concealed by the headband structure, and
   the at least one sliding spring element is configured to be guided by the headband structure as well as the at least one guiding element and can be moved into the at least one flexible section and out of the at least one flexible section to thus selectively increase and decrease the stiffness of the at least one flexible section so that a contact pressure of the headset can be adjusted.

2. A headset according to claim 1, wherein the headband structure comprises a longitudinal length, where the headband structure is divided into at least three sections along the longitudinal length, a centre section, a left side section and a right side section, where the headband structure is comprised of one soft, flexible section located in the centre section of the headband and two stiff, non-flexible sections, each located on the left side section and on the right side section of the headband.

3. A headset according to claim 2, wherein the headband comprises one or more sliding spring elements on each of both sides.

4. A headset according to claim 2, wherein in case of two or a greater, even number of sliding spring elements, opposing sliding spring elements are arranged symmetrically with respect to a plane separating the right half and the left half of the headset.

5. A headset according to claim 2, wherein the at least one sliding spring element is a metal blade spring element.

6. A headset according to claim 1, wherein the headband comprises one or more sliding spring elements on each of both sides.

7. A headset according to claim 6, wherein in case of two or a greater, even number of sliding spring elements, opposing sliding spring elements are arranged symmetrically with respect to a plane separating the right half and the left half of the headset.

8. A headset according to claim 6, wherein the at least one sliding spring element is a metal blade spring element.

9. A headset according to claim 1, wherein in case of two or a greater, even number of sliding spring elements, opposing sliding spring elements are arranged symmetrically with respect to a plane separating the right half and the left half of the headset.

10. A headset according to claim 1, wherein the at least one sliding spring element is a metal blade spring element.

11. A headset according to claim 1, wherein the contact pressure can be adjusted in a range between 350 grams and 500 grams or between 550 grams and 700 grams.

12. A headset according to claim 1, wherein a position of the at least one sliding spring element, respectively the at least one handle element, relative to the headband structure is indicated visually by a visual indication means.

13. A headset according to claim 1, wherein a position of the at least one sliding spring element, respectively the at least one handle element, relative to the headband structure is indicated via a tactile feedback.

14. A headset according to claim 1, wherein the at least one guiding element is made out of a material featuring high stiffness and/or low friction and/or high dimensional stability.

15. A headset according to claim 1, wherein an indication means features a discrete scale or a continuous scale for the indication of the position of the at least one sliding spring element.

16. A headset according to claim 1, wherein the at least one sliding spring element is at most visible through the gaps enabling the relative movement between sliding spring element and headband structure.

17. A headset according to claim 1, wherein a rigid, top section of the headband structure does comprise an additional element for increasing the sliding length of the at least one sliding spring element.

* * * * *